United States Patent [19]

Roscamp et al.

[11] 4,081,846
[45] Mar. 28, 1978

[54] MAGNETIC HEAD-SLIDER ASSEMBLY

[75] Inventors: Thomas A. Roscamp; George W. Gibson, both of Goleta; Pierre Anthony John Minton Shelley, Santa Barbara, all of Calif.

[73] Assignee: Applied Magnetics Corporation, Goleta, Calif.

[21] Appl. No.: 801,759

[22] Filed: May 31, 1977

Related U.S. Application Data

[63] Continuation-in-part of Ser. No. 693,367, Jun. 7, 1976, abandoned.

[51] Int. Cl.² ............................................. G11B 5/60
[52] U.S. Cl. ............................................. 360/103
[58] Field of Search ............................. 360/103, 102

[56] References Cited
U.S. PATENT DOCUMENTS 3,855,625  12/1974  Garnier et al. .................. 360/103
3,961,372   6/1976  Brock et al. ..................... 360/102

Primary Examiner—Robert S. Tupper
Attorney, Agent, or Firm—Daniel J. Meaney, Jr.

[57] ABSTRACT

A multi-channel magnetic head-slider assembly having a ceramic member having a bottom slider face which is adapted to ride on a thin fluid film a predetermined distance above a moving media wherein the slider face has a hollowed out, central area having a wedge shaped inner surface formed in the interior of the bottom slider face which defines a first and second parallel planar fluid bearing support rail which extend in spaced parallel alignment along the side of the ceramic member and each of which have one end which terminates in sloped surface defining a leading edge relative to the moving media and each of which terminate in and are integral with a third flat fluid support surface forming a trailing edge which is perpendicular to said first and second fluid bearing support rails and a plurality of magnetic transducers having a preselected gap width and predetermined spacing are mounted on the end of the ceramic member at the trailing edge of the ceramic member with the gap of each head adjacent to and in alignment with said third flat support surface forming a plurality of tracks with a moving media wherein the width of each track is substantially equal to the preselected gap and the spacing between the tracks is substantially equal to the predetermined spacing between magnetic transducers is shown.

12 Claims, 11 Drawing Figures

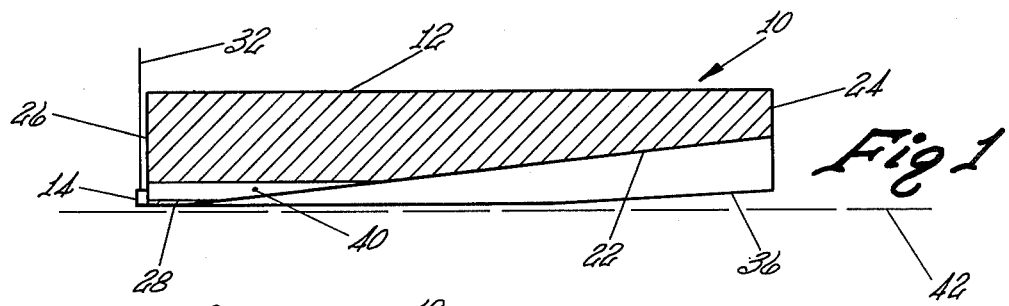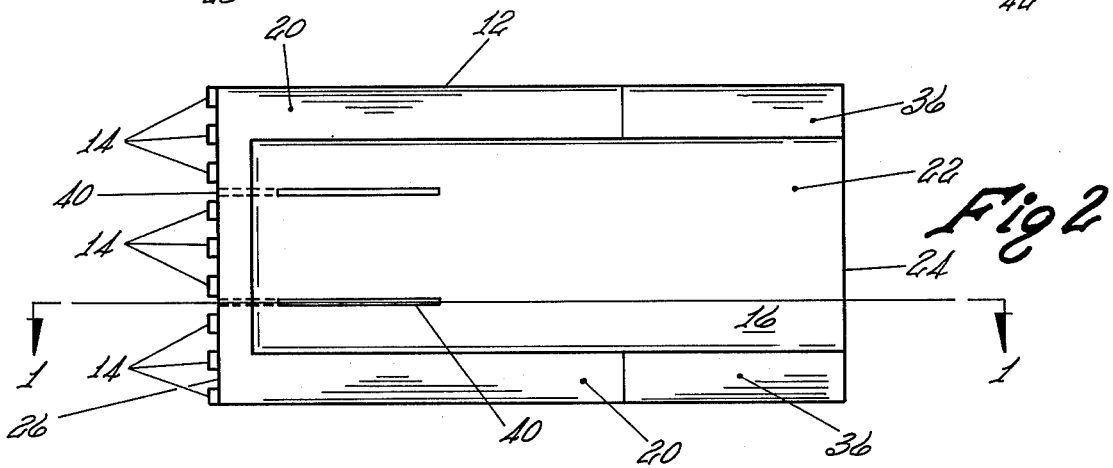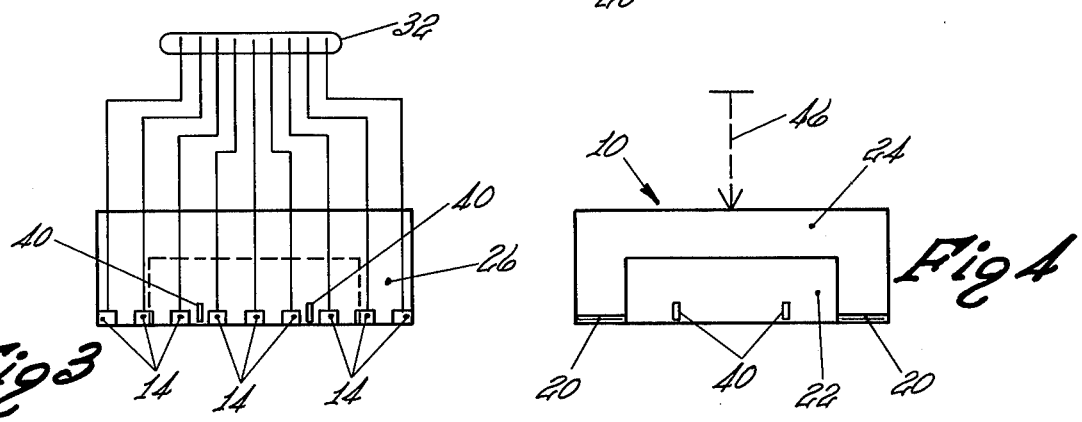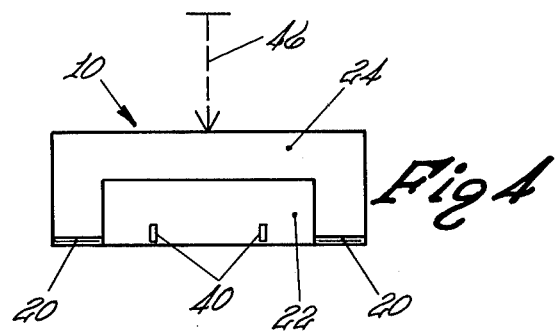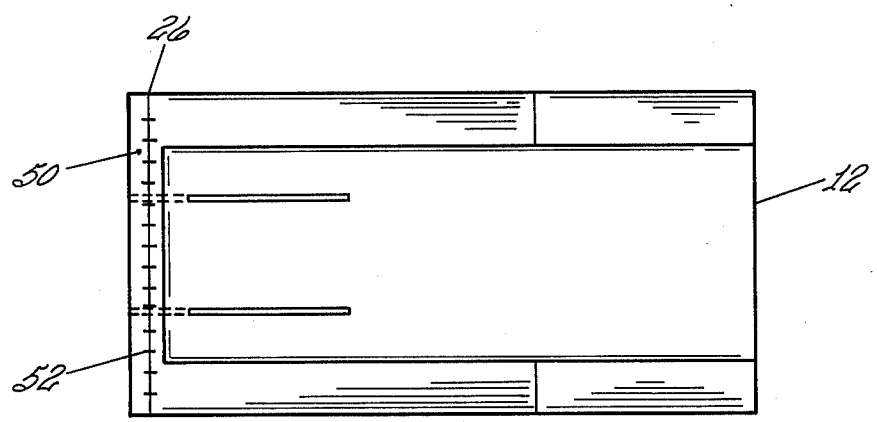

MAGNETIC HEAD-SLIDER ASSEMBLY

This is a continuation-in-part of application Ser. No. 693,367, filed June 7, 1976, now abandoned.

FIELD OF THE INVENTION

The present invention relates to magnetic head-slider assemblies, and more particularly to air bearing slider assemblies used for noncontact recording in magnetic disc files and the like.

DESCRIPTION OF THE PRIOR ART

It is known in the prior art to utilize magnetic head-slider assemblies formed of an air bearing slider assembly and magnetic transducers affixed thereto for noncontact recording in magnetic disc files. It is also known to mount such magnetic head assemblies having air bearing slider assemblies on to carriages which are used in integrated data modules for storage of digital information on a plurality of magnetic discs. In order to increase the density of storage on such magnetic disc files, attempts have been made to make each track width for storing digital data as narrow as possible, to reduce the spacing between each track to increase the number of tracks per inch and to develop magnetic head assemblies which are capable of recording and reproducing digital information using as small a section of each track as possible for storage of digital data.

In particular, it is known in the prior art to fabricate air bearing slider assemblies of ceramic or other materials. In the prior art devices, it is necessary to precisely grind, lap and polish the ceramic body to establish a plurality of extremely thin parallel spaced air bearing surfaces each of which has a width equal to the width of a track. In such magnetic head assemblies, it is necessary to fabricate air bearing surfaces having a thickness in order of 0.002 inches. The air bearing surfaces which support the magnetic head assemblies require surfaces in the order of 0.020 inches. Thus, great care must be taken when grinding and preparing the extremely thin small air bearing surface equal to the track width of a track on a moving disc. During the grinding and polishing process, a substantial number of such air bearing slider bodies are destroyed thereby decreasing the overall yield and increasing the manufacturing costs.

It is also known in the prior art to fabricate a multi-channel magnetic head wherein the ceramic member is formed of a plurality of equal width spaced parallel air bearing surfaces. For example, it is known to fabricate a magnetic head assembly wherein the width of each air bearing surface is .019 inches, with each air bearing surface being aligned with a magnetic transducer resulting in a track width equal to 0.019 inches.

One disadvantage of the prior art magnetic head assembly is that the ceramic member must be cut, ground, lapped and polished into a plurality of extremely thin air bearing surfaces the width of which dictate the ultimate width and spacing of tracks on a moving magnetic media. As a result of such limitations, a limit is approached as to the width per track and the number of tracks per inch on a moving media.

SUMMARY OF THE INVENTION

The present invention overcomes the disadvantages of the known prior art devices for several reasons.

In the preferred embodiment of the present invention the magnetic head assembly comprises a body defining a base face having formed thereon a pair of spaced aligned fluid bearing surfaces of a predetermined width extending along the edges thereof. The base face has an interior area located between the spaced parallel bearing surfaces formed into a ramp surface which extends from an intermediate point from the body edge at one end to be integral with the base face at the other end of the body terminating in a substantially flat thin end fluid bearing surface. The end fluid bearing surface is substantially perpendicular to and integral with the parallel fluid bearing surfaces to form a fluid bearing support surface for the head slider assembly. At least one magnetic transducer, or a plurality of magnetic transducers to form a multi-channel magnetic head assembly, are affixedly mounted at the other edge of the body at the end defining the thin end of the fluid bearing surface and the transducer is positioned with its gap adjacent to and in alignment with the end fluid bearing surface.

The present invention overcomes the disadvantages of the prior art devices by eliminating the requirement to cut, grind, lap and polish extremely thin air bearing surfaces having dimensions equal to those of a track width. In the present invention, a pair of aligned air bearing surfaces and a thin end air bearing surface function to support the ceramic body on a thin film of air or fluid of a predetermined thickness. The thickness of the thin film is determined by the flying characteristics of the magnetic head assembly, the rotations per minute of a moving disc file and the overall weight of the magnetic head assembly. Magnetic transducers are attached to the end of the ceramic slider and the width of the gap of the magnetic head and the spacing between heads establish and determine track width and track spacing.

One advantage of the present invention is that the gap width of magnetic transducers in the order of 0.001 inches are possible and track spacings in the order of 0.010 inches are possible.

Another advantage of the present invention is that each track width can be very small in width, the spacings between each track can be reduced thereby increasing the overall storage density capability of a magnetic disc file.

Yet another advantage of the present invention is that the flying height of the magnetic head-slider assembly relative to the moving media can be controlled with a differential fluid release bypass aperture.

BRIEF DESCRIPTION OF THE DRAWING

The foregoing and other objects, features and advantages of the invention will be apparent from the following description of the preferred embodiment of the invention when considered together with the illustrations in the accompanying drawings which include the following figures:

FIG. 1 is a front cross-sectional view of a multi-channel magnetic head assembly taken along section lines 1 — 1 of FIG. 2;

FIG. 2 is a bottom view of the multi-channel magnetic head assembly of FIG. 1;

FIG. 3 is a left end view of the multi-channel magnetic head assembly of FIG. 1;

FIG. 4 is a right end view of the multi-channel magnetic head assembly of FIG. 1;

FIG. 5 is a bottom view of another embodiment of a multi-channel magnetic head assembly using the teachings of the present invention;

DESCRIPTION OF THE PREFERRED EMBODIMENT

Figure 6:
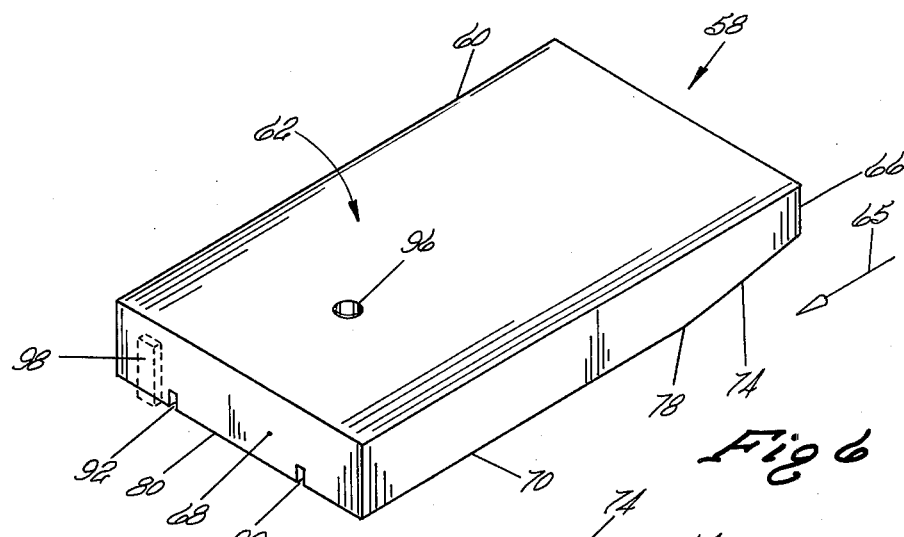
FIG. 6 is an isometric top view showing another embodiment of a slider assembly having a differential fluid release bypass aperture to control the width of the fluid bearing.
Figure 7:
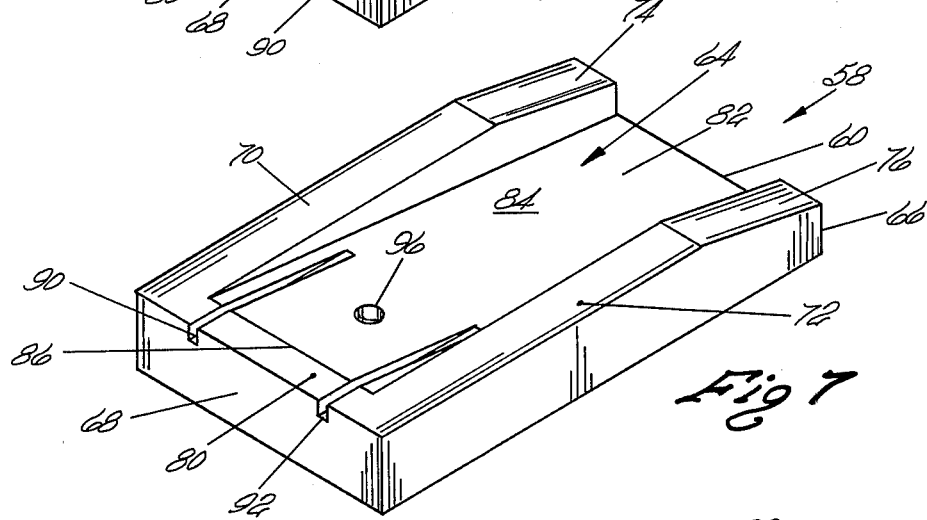
FIG. 7 is an isometric bottom view of the embodiment of FIG. 6.
Figure 8:
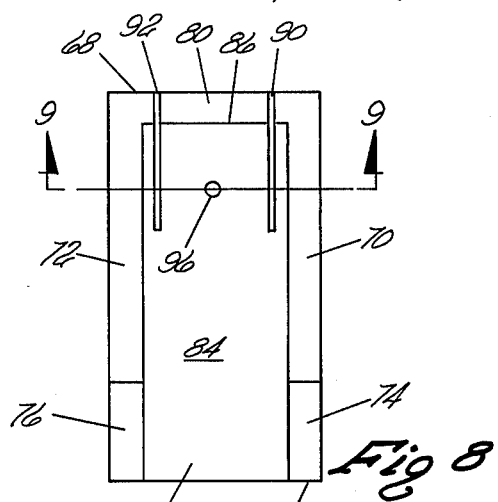
FIG. 8 is a bottom view of a slider having wide planar parallel fluid support rails and a bleeding aperture.

In FIG. 1 the magnetic head assembly is generally designated as 10 and is formed of a body 12 which is formed of a hard glass-type material such as ceramic. At least one magnetic transducer, generally designated as 14, is fixedly mounted on one end of the body 12.

Referring to FIGS. 1 and 2 together, the ceramic body 12 defines a base face 16 having formed thereon a pair of spaced aligned fluid bearing surfaces of a predetermined width 20, which may be referred to as a pair of spaced parallel fluid support rails, which extend along the edge of body 12. The area located between the spaced parallel bearing surfaces 20 form into a ramp surface, shown as ramp surface 22 in FIG. 1, which extends from an intermediate point of the body edge 24 to the base face at the other end 26. The ramp surface 22 terminates in a substantially flat surface, generally designated as 28 which defines a thin and fluid bearing surface which is substantially perpendicular to and integrated with the fluid bearing surfaces 20 to form a fluid bearing support surface defined by fluid bearing surfaces 20 and end fluid bearing surface 28.

The transducers 14 have conductors 32 which extend therefrom and are used to electrically connect magnetic transducers to electrical circuitry (not shown). The magnetic transducers 14 are positioned with its gap in alignment with the end fluid bearing surface 28.

In the preferred embodiment, as shown in FIG. 1, the portion of the space parallel bearing surfaces 20 adjacent edge 24 are formed into a ramp 36 having deflection toward edge 24 with the deviation of the ramp being relatively small compared to the thickness of the ceramic body 12.

In the event that the debris or other foreign material are developed or collected within the ramp or wedge shaped area 22 and ceramic body 12, a plurality of slots 40 are formed in the body 12 which extend from the outer surface of edge 26 through the ceramic body 12, which slot extends in a direction substantially parallel to the fluid bearing surfaces 20, and into communication with the ramp surface 22 located between the fluid bearing surfaces 20. In operation, any foreign material or debris collected within this area would pass between the slots 40 and be removed from the magnetic head assembly and not disturb the spacing formed between the head assembly 10 and a moving media 42.

FIG. 3 shows the end 26 which supports the transducers 14 in spaced alignment with the gap of the transducers 14 adjacent the thin end fluid bearing surface 28. The conductors 32 electrically connected to the magnetic transducers 14 extend therefrom. The depth of the ramp surface 22 is shown by the dashed line 22 in FIG. 3.

FIG. 4 shows edge 24 of an air bearing slider which shows in detail the slope of the ramp surface 22, the location of slots 40 and the slide deviation of the ramp surface formed on the spaced parallel bearing surfaces 20. The magnetic head assembly 10 is mechanically connected to an arm or some other positioning means or actuating means, generally designated by dashed arrow 46. In operation, the actuator or positioning means 46 is capable of moving the magnetic head assembly into any predetermined position relative to the moving media 42 such that a selected magnetic transducer can be addressed to a selected track, a selected track sector, or a portion of a track sector which is a function of the relative position between the magnetic transducer and the rotation of the moving media contiguous the transducer.

In the preferred embodiment, the spaced parallel bearing surface has a dimension in the order of 0.002 inches. The overall length of the ceramic body is in order of 0.3 inches with the ramp surface of the spaced parallel bearing surfaces 20 being about 0.1 inches in length. The overall width of the ceramic body would be in the order of 0.150 inches to 0.200 inches. The dimension of the thin end fluid bearing 28 is in the order of 0.005 inches. The height or thickness of the ceramic body 12 is in the order of 0.050 inches to 0.100 inches. At the edge 24, the ramp surface 22 is in the order of 0.005 inches to 0.010 inches away from the base face 16. The deflection of the ramp 37 on the bearing surfaces 20 is in the order of 0.0001 inches to about 0.0002 inches. The slots 40 having a height of about 0.002 inches.

The air bearing slider or ceramic body 12 has utility in supporting a thin film magnetic transducer. Such transducers are fabricated using known thin film techniques and are relatively light weight and have extremely thin gap widths. Due to the small physical size of such thin film transducers, the transducers can be closely spaced to produce extremely narrow track widths and extremely close spacings between each track. In the preferred embodiment of the present invention, the width of a single track can be in the order of 0.001 inches to about 0.010 inches with track widths between transducers in the order of 0.010 inches.

The embodiment in FIG. 5 utilizes the same ceramic element 12 but has an additional end gap 50 on end 26. By use of the end gap 50, conventional ferrite transducers or other types of magnetic transducers can be affixed to edge 26 obtaining the same advantages as that of thin film transducers. However, the size of the ceramic body 12 may be larger than that used for thin film transducers, but the advantages of controlling spacings between each track without the requirement of precisely grinding and polishing an air bearing surface having dimensions equal to a track width is eliminated. Of course, the number of conventional transducers 52 that can be mounted on an air bearing slider is a function of the weight, track width and other physical limitations embodied by using such conventional magnetic transducers 52.

In the embodiment illustrated in FIGS. 1 to 5, inclusive, the leading edges of the magnetic head-slider assembly are the sloped or tapered ends 36 of the pair of parallel spaced fluid bearing rail surfaces 20. The trailing edge is the flat fluid bearing surface located at the end of the ceramic body 26 which extends between the parallel rail surface 20. Thus, the direction of movement of the information media relative to the magnetic head-slider assembly is such that the fluid enters the open end of the wedge-shaped chamber 16 located between rails 20. The fluid is deflected and, in the case of air, is compressed by the sloping surface 22. The fluid is then passed under the trailing edge causing the magnetic head-slider assembly to fly on a fluid bearing located between the surface of rails 20 parallel to the moving media and the flat fluid bearing surface located at the trailing edge 26, extending between fluid bearing rail surface 20 and at the closed end of the wedge-shaped chamber 16.

The magnetic head-slider assembly illustrated in FIGS. 1 to 5, inclusive, requires that the flying characteristics including flying height be precisely calculated and that the slider assembly be fabricated and assembled to obtain the desired flying characteristics and flying height.

FIGS. 6 to 11, inclusive, show other embodiments of a slider assembly wherein the flying height can be controlled or set by means of a differential fluid release bypass aperture and by varying other parameters, such as the width of the parallel, planar spaced rails.

FIGS. 6 to 9, inclusive, show one embodiment of a magnetic head-slider assembly for flying a magnetic head on a fluid bearing relative to an information storing media in a predetermined direction in an ambient fluid. In this embodiment, the fluid is air. The slider assembly, generally shown as 58, has a support body 60 having a top surface shown generally as 62 and a fluid bearing surface shown generally as 64. Surface 64 flies above the media shown diagrammatically as arrow 65 and in the predetermined direction shown by the head of arrow 65. The support body 60 has a leading edge 66 and a trailing edge 68 relative to the media depicted by arrow 65. The fluid bearing surface 64 has a pair of parallel, planar fluid support rails 70 and 72 extending in a direction opposite to the predetermined direction of movement shown by arrow 65. Each end of the support rails 70 and 72 has a leading edge 74 and 76, respectively, which is shaped slightly away from the surface of the media shown by arrow 65 to form a slight angle between the edge of each fluid support rail and the plane defined thereby.

A flat fluid support surface 80 extends transverse to the predetermined direction of movement of the media shown by arrow 65, between and substantially planar to the fluid support rails 70 and 72 to define the trailing edge 68 relative to the leading edge 66.

A ramp surface 82 extends from the flat fluid support surface 80 and between the spaced fluid support rails 70 and 72. The ramp surface 82 has a preselected angle to form a wedge-shaped chamber 84 having an opening located between the leading edges 74 and 76 of the fluid support rails 70 and 72, respectively. The wedge-shaped chamber 84 has a closed end 86 located adjacent the flat fluid bearing surface 80.

At least one magnetic transducer, shown by dashed transducer 88, is fixedly mounted at the trailing edge 68 of the body 60. The magnetic transducer 88 is positioned with the gap adjacent to and in alignment with the flat fluid bearing surface 68.

In the embodiment of FIGS. 6 to 9, inclusive, a pair of spaced parallel slots 90 and 92 are formed through the trailing edge 68 of the body 60 and extend in a direction substantially parallel to the spaced parallel fluid support rails 70 and 72 and into communication with ramp surface 82.

The flying height of the body 60 relative to the media shown by arrow 65 can be controlled or set by bleeding off a small amount of the fluid within chamber 84. A differential fluid release bypass aperture 96 is formed through body 60. The preferred embodiment is to have aperture 96 normal to the surface of media shown by arrow 65. A differential fluid pressure flow is developed between the fluid bled off by aperture 96 and the fluid passing under the flat fluid support surface 80. By controlling the diameter of aperture 96, the desired differential pressure, flying height and fluid bearing thickness can be obtained.

Figure 10:
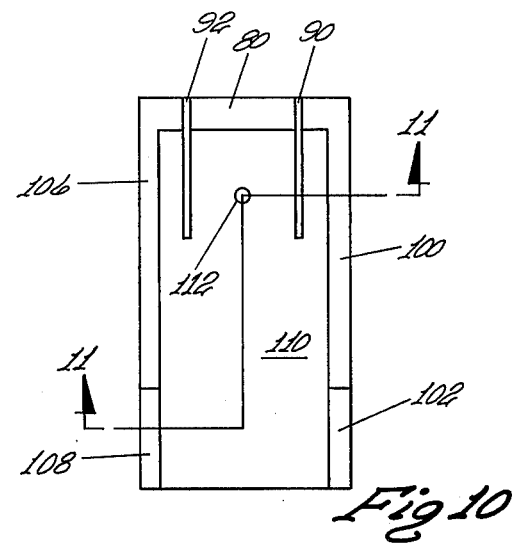
FIG. 10 is a bottom view of another embodiment of a slider having narrow planar parallel fluid support rails and a bleeding orifice.
Figure 9:
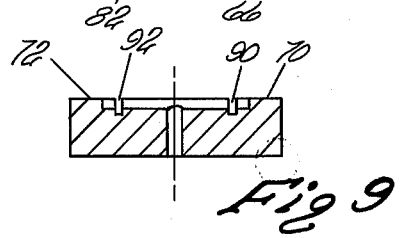
FIG. 9 is an end sectional view taken along section lines 9 — 9 of FIG. 8.
Figure 11:
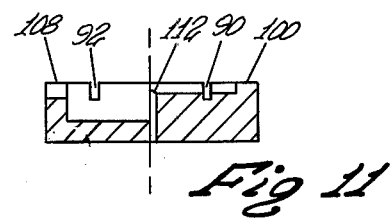
FIG. 11 is an end sectional view taken along section lines 11 — 11 of FIG. 10.

FIGS. 10 and 11 show another embodiment wherein spaced rails 100 and 106 are very narrow and have narrow sloped portions 102 and 108, respectively. A wedge-shaped chamber 110 is larger in size and the differential fluid release bypass aperture 112 is selected to have an appropriate diameter to obtain the desired flying height.

In the embodiment described herein, the ceramic structure is initially formed from a chemically machined, photosensitive glass such as that sold by Corning Glass Works under the Trademark "FOTOFORM". The photosensitive glass is transformed into an opaque glass-ceramic by subsequent heat treatment and such product is referred to as "FOTOCERAM", a trademark of the Corning Glass Works.

Typical characteristics of the FOTOCERAM glass ceramic used in this invention is as follows:

| FOTOCERAM GLASS-CERAMIC | |
|---|---|
| Mechanical Properties | |
| Young's (Elastic) Modulus, psi × $10^6$ | 12.62 |
| Shear Modulus, psi × $10^6$ | 5.30 |
| Modulus of Rupture, Abraded, psi | 21.500 |
| Poisson's Ratio | 0.19 |
| Knoop Hardness (100 g. Wilson-Tukon) | 488 |
| Design Tensile Strength, psi | 3000 |
| Electrical Properties | |
| Volume Resistivity, ohms × $10^{12}$ | |
| 25° C | 460 |
| Power Factor, at 1 MHz | |
| 20° C | 0.004 |
| 200° C | 0.014 |
| Dielectric Constant, at 1 MHz | |
| 20° C | 5.90 |
| 200° C | 6.40 |
| Loss Factor, at 1 MHz | |
| 20° C | 0.0236 |
| Dielectric Strength, volts/mil (10 mil sample thickness, DC under oil | |
| 25° C | 4400 |

In summary, the flying characteristics of the magnetic head-slider assembly can be determined and a fixed design therefor can be elected as shown on the embodiments of FIGS. 1 to 5, inclusive. The flying characteristics can be controlled or precisely set or determined by varying the width of the rails, the width of the flat fluid bearing surface, angle of the ramp surface, angle of the leading edge of the rails and body, size of the differential fluid release bypass aperture and other similar factors. The use of thin film, batch fabricated magnetic transducer with the slider assembly results in a magnetic head-slider assembly for recording at high bit densities and narrow track widths in magnetic disc files or data storage modules.

What is claimed is:

1. A magnetic head-slider assembly for flying a magnetic head on a fluid bearing relative to an information storing media moving in a predetermined direction in the fluid comprising a support body including means defining a fluid bearing surface having leading and trailing edges and which flies above the moving media, said fluid bearing surface defining means having a pair of spaced parallel planar fluid support rails extending in the same direction as the predetermined direction of movement of said media wherein one end of each fluid support rail near the leading edge is sloped slightly away from the plane of the rail and the surface of the media to form a slight angle between that end of each fluid support rail and the plane defined by said planar support rails;

a flat fluid support surface extending transverse to the predetermined direction of movement of said media and extending between and substantially planar to the fluid support rails near the trailing edge;

a ramp surface extending from said flat fluid support surface and between said spaced fluid support rails and having a slope of a preselected angle to form a wedge shaped chamber having an opening located between the leading edges of the fluid support rails and having a closed end located adjacent said flat fluid support surface; and at least one magnetic head fixedly mounted at the trailing edge of said body and positioned with the gap of said magnetic head adjacent to and in alignment with said flat fluid bearing surface; said ramp surface being operative to receive fluid at the open end of said wedge shaped chamber and direct the same pass the flat fluid support surface producing a lifting force thereagainst which causes said support body and magnetic head to fly over said moving medium on a fluid bearing formed between the spaced parallel fluid support rails adjacent said moving media and the flat fluid support surface extending between said spaced parallel fluid support rails.

2. The magnetic head-slider assembly of claim 1 wherein the deflection of the leading edge of each of said spaced parallel fluid support rails is relatively small compared to the thickness of said body.

3. The magnetic head-slider assembly of claim 2 wherein at least a single slot is formed through the other edge of the trailing edge of the body and extending in a direction substantially parallel to the spaced parallel fluid support rails and into communication with the ramp surface located therebetween.

4. The magnetic head-slider assembly of claim 3 wherein a pair of spaced parallel slots are formed in the trailing edge of the body.

5. The magnetic head-slider assembly of claim 3 wherein said support body includes means for defining through said body a differential fluid release bypass aperture adjacent the trailing edge of the body and having a diameter selected to be of a geometrical dimension to deflect a small amount of the fluid from said wedge shaped chamber to control the thickness of the fluid bearing formed between the body and moving media and the flying height of the magnetic transducers relative to the moving media.

6. A slider for supporting a transducer which flies on a fluid relative to a media moving in a predetermined direction in the fluid comprising a support body including means defining a fluid bearing surface having leading and trailing edges and which flies above the moving media, said fluid bearing surface defining means having a pair of spaced parallel planar fluid support rails extending in the same direction as the predetermined direction of movement of said media wherein one end of each fluid support rail near the leading edge which is sloped slightly away from the plane of the rail and the surface of the media to form a slight angle between that end of each fluid support rail and the plane defined by said planar support rails;

a flat fluid support surface extending transverse to the predetermined direction of movement of said media and extending between and substantially planar to the fluid support rails near the trailing edge;

a ramp surface extending from said flat fluid support surface and between said spaced fluid support rails and having a slope of a preselected angle to form a wedge shaped chamber having an opening located between the leading edges of the fluid support rails and having a closed end located adjacent said flat fluid support surface; and said ramp surface being operative to receive fluid at the open end of said wedge shaped chamber and direct the same pass the flat fluid support surface producing a lifting force thereagainst which causes said support body to fly over said moving medium on a fluid bearing formed between the spaced parallel fluid support rails adjacent said moving media and the flat fluid support surface extending between said spaced parallel fluid support rails.

7. The slider of claim 6 wherein a pair of spaced parallel slots are formed in the trailing edge of the body.

8. The slider of claim 6 wherein said support body includes means for defining a differential fluid release bypass aperture adjacent the trailing edge of the body and having a diameter selected to be of a geometrical dimension to deflect a small amount of the fluid from said wedge shaped chamber to control the thickness of the fluid bearing formed between the body and moving media and the flying height of the slider relative to the moving media.

9. A multi channel magnetic transducer-slider assembly comprising a ceramic member having a bottom slider face having leading and trailing edges and which is adapted to ride on a thin fluid film a predetermined distance above a moving media, said bottom slider face defining first and second substantially planar fluid bearing rails which extend in spaced parallel alignment along the edges of the member and which terminate in and are integral with a third flat fluid support surface which is located between and perpendicular to said first and second fluid bearing rails near the trailing edge, said bottom slider face including means defining a ramp surface extending from said third flat fluid support surface and between said first and second spaced fluid support rails and having a slope of a preselected angle to form a wedge shaped chamber having an opening located between the leading edges of the fluid support rails and having a closed end located adjacent said flat fluid support surface;

a plurality of magnetic transducers each having a gap width of a preselected dimension and which are spaced at a predetermined spacing therebetween, said magnetic transducer being mounted on the trailing edge of said ceramic member at the third fluid bearing surface and positioned with the gap of each head adjacent to and in alignment with said third fluid bearing surface;

said plurality of magnetic transducers and said ceramic member co-acting with a moving media to enable said bottom slider surface and magnetic heads to be supported on a fluid film formed between said first, second and third bearing surfaces, said ramp surface and the surface of a moving media; and said ramp surface is operative to receive fluid at the open end of said wedge shaped chamber and direct the same pass the flat fluid support surface producing a lifting force thereagainst to position said plurality of transducers a predetermined distance above the surface of said media equal to the thickness of said fluid film to position said heads across a moving media forming a plurality of tracks thereon wherein the width of each track is substantially equal to the preselected gap width of each magnetic transducer and the spacing between each track is substantially equal to the predetermined spacing between each magnetic transducer.

10. The multi channel magnetic head-slider assembly of claim 9 wherein one end of each of said first and second fluid bearing rails near the leading edge is sloped away from the plane of the rail and moving media with the deviation thereof being relatively small compared to the thickness of said ceramic member.

11. The multi channel magnetic transducer-slider assembly of claim 9 wherein a pair of spaced parallel slots are formed in the trailing edge of the body.

12. The multi channel magnetic transducer-slider assembly of claim 9 wherein said support body includes means for defining through said body a differential fluid release bypass aperture adjacent the trailing edge of the body and having a diameter selected to be of a geometrical dimension to deflect a small amount of the fluid from said wedge shaped chamber to control the thickness of the fluid bearing formed between the body and moving media and the flying height of the magnetic transducers relative to the moving media.

* * * * *